April 24, 1956   M. L. CHANDLER ET AL   2,742,865
TIE-DOWN
Filed Feb. 17, 1953   3 Sheets-Sheet 3
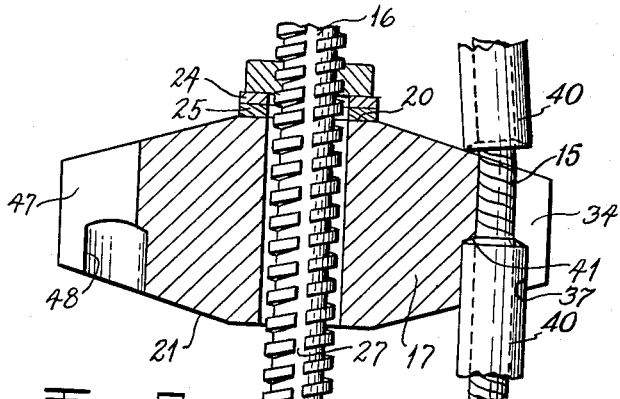
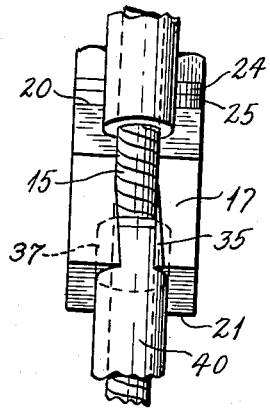
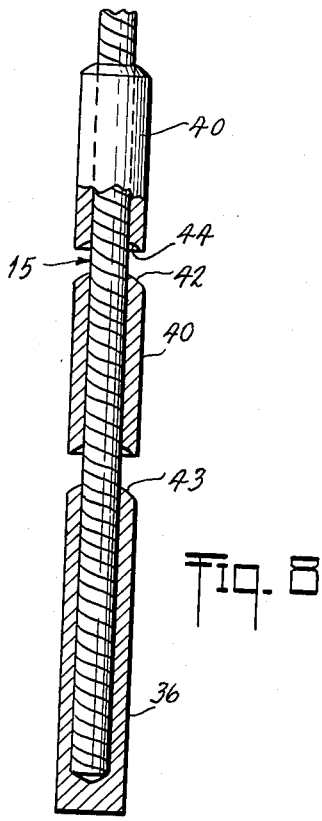
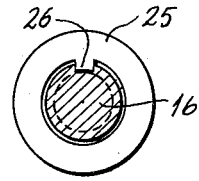
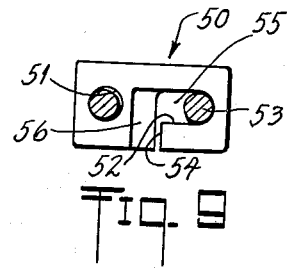
INVENTORS.
MURRAY L. CHANDLER
LEON J. LICHTENSTEIN
BY
Roderick B. Jones
ATTORNEYS United States Patent Office 2,742,865
Patented Apr. 24, 1956

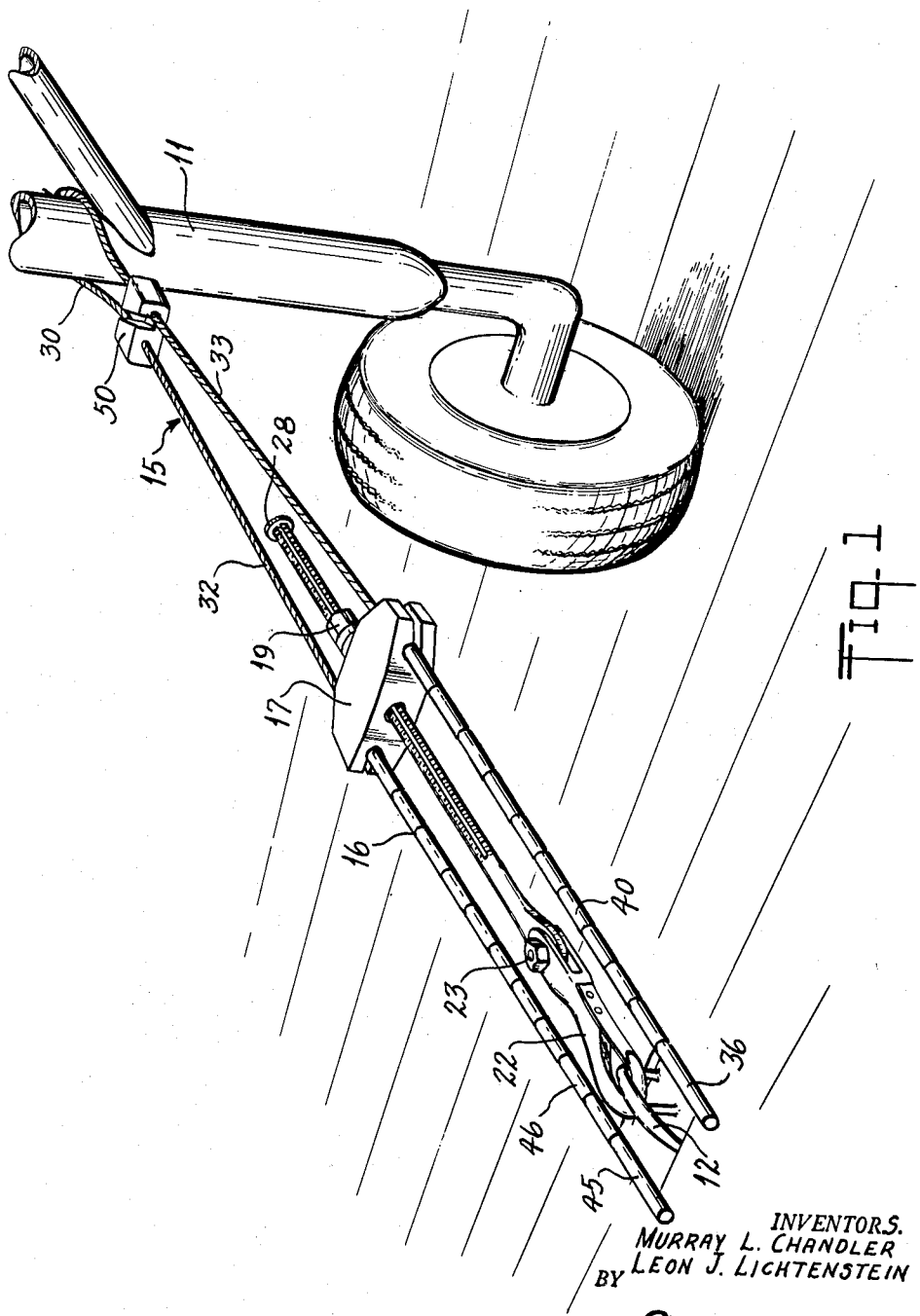

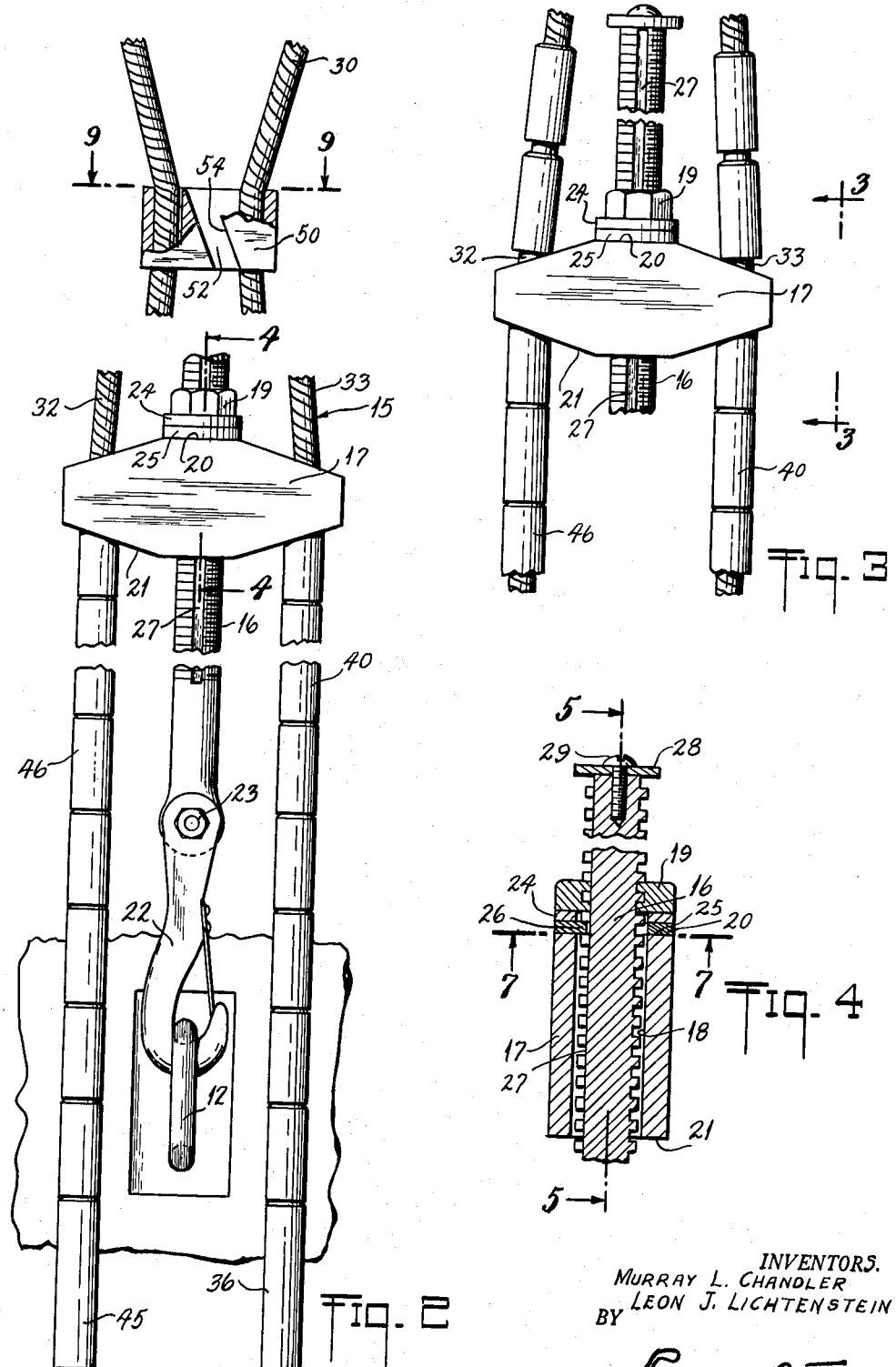

2,742,865

TIE-DOWN

Murray L. Chandler, Dallas, Tex., and Leon J. Lichtenstein, Philadelphia, Pa.

Application February 17, 1953, Serial No. 337,448

8 Claims. (Cl. 105—369)

(Granted under Title 35, U. S. Code (1952), sec. 266)

The invention described herein may be manufactured and used by or for the Government of the United States of America for governmental purposes without the payment of any royalties thereon or therefor.

This invention pertains to the art of stowing heavy and bulky equipment, such as airplanes and the like vehicles, and is adapted particularly for use on ships. The invention is embodied in a tie-down by means of which an airplane or the like equipment may be secured to the deck on which it rests, of a ship or the like vehicle.

The invention is particularly adapted to stow carrier aircraft in allotted deck space of an aircraft carrier. The tie-down of the invention is easily and quickly operated to secure and hold an airplane positioned firmly in its allotted space. The invention also may be used for stowing deck cargo, for example on a cargo ship. The structure of the tie-down is such that it more efficiently absorbs and dissipates the stresses and strains of storms and heavy weather operating against stowed equipment and this operates to prevent the equipment from becoming dislodged and thrown in a manner that may cause damage to the aircraft, the ship or to other aircraft in the vicinity.

In its essential particulars, the tie-down of the present invention comprises a flexible tension member and a rigid tension member positioned in line with each other, and a connection between the tension members securing them to each other. Each of the tension members comprises an attachment at its end that corresponds with its corresponding end of the tie-down, the attachment of each tension member being disposed in the member remote from the connection between the tension members. Thus, the attachments constitute opposite end attachments on the tie-down and are adapted to be secured respectively to the deck and to a convenient stress member of the aircraft, thereby attaching the aircraft securely to the deck in its allotted space.

The rigid tension member comprises a jack post. The connection between the rigid and flexible tension members comprises a pressure block, and the jack take-up of the jack post bears against the pressure block. A securing means between the pressure block and the flexible tension member completes the tie-down as a continuous tension member attached at its respective opposite ends to the deck and the aircraft to hold the latter in its position of stowage. The position of the securing means along the flexible tension member may be varied, and this adjusts the overall length of the tie-down in accordance with the needs of any particular use.

In the embodiment of the disclosed, the flexible tension member constitutes a flexible strand, a conventional stranded tension cable being suitable for the purpose. The cable may be wrapped around any convenient stress member of an aircraft to be stowed, and forms a bight which constitutes that end attachment of the tie-down which is incident to the flexible tension member. The bight is formed to comprise two legs, which are disposed alongside each other, and which are positioned alongside the jack post on respective opposite sides thereof. The securing means comprises a securing device or member for each leg of the tension cable, the securing members being positioned in the pressure block severally on respective opposite sides of the jack take-up.

Principles of the invention will be clear from the accompanying drawing, which discloses a preferred embodiment thereof, and to which attention is now directed. In the drawings Fig. 1 is a perspective of a tie-down of the invention, in use for stowing an aircraft in allotted stowage space on the deck of an aircraft carrier, Fig. 2 is a fragmentary elevation of the tie-down, viewed by looking at it downwardly in Fig. 1, Fig. 3 is an elevation similar to Fig. 2, showing a different length adjustment of the tie-down of Fig. 1, Fig. 4 is a detailed cross-sectional elevation, taken on line 4—4 of Fig. 2, Fig. 5 is a detailed cross-sectional elevation, taken on line 5—5 of Fig. 4, Fig. 6 is a side elevation of the detail of Fig. 5, viewed from the right of the figure, Fig. 7 is a detailed cross-section, taken on line 7—7 of Fig. 4, Fig. 8 is a fragmentary detail partly in section on the longitudinal center plane of the flexible cable, and Fig. 9 is a cross-section on line 9—9 of Fig. 2.

As seen in Fig. 1, the tie-down is attached at its respective opposite ends, one attachment being to the aircraft to be stowed, and the other attachment being to the deck on which the aircraft rests. The tie-down then is drawn taut to hold the aircraft securely in place. At its one end, the tie-down is attached to a convenient stress member of the aircraft, such as the landing-gear post 11, and at its other end the tie-down is attached to a conveniently near deck eye 12, of which there are a number distributed over the area of the deck that is assigned to the stowing of aircraft.

The tie-down comprises the flexible tension member 15 and the rigid tension member 16 in line with each other, and connected to each other by means of a suitable connection. In the disclosed embodiment, the connection between the members 15 and 16 comprises the pressure block 17. The rigid tension member 16 comprises a jack post, which in the disclosed embodiment is a jack screw or bolt, and which is secured to the pressure block 17 by being projected through center bore 18 thereof. Nut 19 is threaded onto jack screw 16, and bears against abutment surface 20 of pressure block 17 to constitute the jack take-up.

Jack post 16 projects out of the bore 18 from the surface 21 of block 17 opposite the bearing surface 20, and at its end comprises the attachment 22 by means of which the end of the tie-down that corresponds with the rigid tension member 16 is secured to the deck. Attachment 22 is a hook of a structure that adapts it to be hooked onto any conveniently located deck eye 12 quickly and easily. Hook 22 is attached to the jack screw 16 at its end by means of the pivot pin 23 in the form of a bolt, and this prevents rotation of the jack screw on its axis with reference to the hook 22.

Washers 24 and 25 are interposed between the nut 19 and abutment surface 20 of pressure block 17, and serve the usual purposes of washers. The washer 25, however, which is in contact with abutment surface 20 of pressure block 17, comprises the key 26 companion to the keyway or slot 27 extending lengthwise of jack screw 16. Being keyed to jack screw 16 by means of the key 26 and keyway 27, washer 25 resists rotation of the jack screw 16 on its axis when the nut 19 is rotated to draw the tie-down taut. The position of pressure block 17 shown in Fig. 1 is its natural position, and the key 26 and keyway 27 hold pressure block 17 against rotating out of its position as shown.

End stop 28 is detachably attached to the end of jack screw 16 that is remote from the hook 22, by means of the screw 29; and this prevents nut 19 from travelling beyond the end of jack screw 16. Stop 28 prevents the tie-down from becoming disassembled as the result of the sort of vibrations the tie-down may be subjected to in a heavy storm. Screw 29 permits removal of end stop 28 when it is desired to disassemble the tie-down.

The flexible tension member 15 in the disclosed embodiment is a stranded tension cable, which may be wrapped around the landing-gear post 11 as shown, forming the bight 30, which accordingly constitutes the end attachment of the tie-down that corresponds with the flexible tension member.

The legs 32 and 33 of bight 30 of cable 15 extend side-by-side away from bight 30 and the landing-gear post 11, and each leg is secured to the pressure block 17 by means of a suitable securing device or member, constituting a securing means between the pressure block 17 and the flexible tension member 15. The several securing devices of the several legs 32 and 33 respectively are disposed in the block 17 on respective opposite sides of the jack screw 16, and on opposite sides of the nut 19 constituting the jack take-up thereof. This locates the two legs 32 and 33 of cable 15 alongside the jack screw 16 on respective opposite sides thereof.

The securing device for the leg 33 of cable 15 comprises the slot 34 at the base of which the cable 15 may be seated by sliding the cable sideways into the slot. The base of slot 34 is located adjacent to the center-bore 18 that contains the jack screw 16, and alongside the jack screw. The slot extends from its base to its opening 35 through the side wall of block 17 in a direction away from the bore 18 and the jack screw 16. The opening 35 of slot 34 is canted at an angle to the base, and to the cable 15 seated in the base, as seen in Fig. 6, and this operates to hold the taut cable against whipping out of the slot 34 under vibrations it may be subjected to during a storm.

Secured to an end of cable 15 coaxially therewith, by brazing or the like means, and as seen in Fig. 8 particularly, is the knob 36. Along the surface 21 of pressure block 17 which is opposite the abutment surface 20, and continuous with the slot 34 is its enlargement that forms the socket 37 into which the knob 36 fits, and in which the knob is adapted to be seated when the cable 15 is seated at the base of slot 34.

The tie-down is adjustable lengthwise to accommodate it to different distances between the landing-gear post 11 of the aircraft positioned where it is desired to be stowed and the nearest convenient deck eye 12. This length adjustment of the tie-down is along the flexible tension member 15, and may be along either leg 32 or 33 of bight 30, or along both legs as shown. A convenient length adjustment of the tie-down is accomplished by means of the beads 40.

Each bead 40 is threaded onto the cable coaxially therewith, and is slidable along its length. Any of the beads 40 fits in the socket 37 and may be seated therein, as seen in Fig. 5. Any number of the total number of beads 40 may be selectively positioned between the pressure block 17 and the end knob 36 of the cable to vary the effective length of the tie-down in accordance with the incident needs. If desired, all the beads 40 may be positioned between pressure block 17 and knob 36, as seen in Figs. 1 and 2, in which case the bead that is most remote from the knob is seated in the socket 37. The tie-down is then adjusted to its shortest length within the limits of adjustability afforded by the set of beads 40. Alternatively, some only of the beads 40 may be positioned between the pressure block 17 and the knob 36, as seen in Fig. 3. The one of the selected beads which is most remote from the knob 36 is seated in socket 37;

and the remaining beads of the set of beads 40 are slid along the cable 15 in position beyond the pressure block 17 where they rest idly as seen in Fig. 3. The effective length of the tie-down is increased thereby. For maximum length adjustment of the tie-down by means of cable 15, all of the beads 40 are positioned along cable 15 beyond the surface 20 of pressure block 17, and the end knob 36 then is seated in the socket 37.

Base 41 of socket 37 is contoured spherically concave as seen in Fig. 5. Of each bead 40, the end surface 42 that is most remote from the end knob 36 of cable 15 and intersects the cable is contoured spherically convex to fit the concave surface 41 and seat therein, and the end surface 43 of knob 36 that is remote from the end of cable 15 and intersects the cable is similarly contoured spherically convex to fit the concave surface 41 of socket 37 and seat therein. The opposite end surface 44 of each bead 40 that intersects the cable 15 is contoured spherically concave to fit and seat against the next adjacent convex end surface 42 of its neighboring bead 40, or the similarly convex end surface 43 of knob 36 if it is next adjacent. By the described structure, the several beads 40 and the knob 36 seat snugly each against its neighbor. The cable 15 in tensioned condition thereby is held rigidly in line as seen in Fig. 1. The special beads allow the cables below the pressure block 17 to bend slightly, thus allowing cables to fit to contour of deck.

Socket 37 companion to any of the beads 40 or the end knob 36 constitutes a securing device between pressure block 17 and the cable 15 that enables length adjustment of the tie-down by socket 37 being variously positioned along the length of leg 33 of the bight 30. This securing device also is releasable so that the leg 33 be freed from the block 17 to enable it to be wrapped around the landing-gear post 11.

If desired, and according to the preferred structure that is shown, similar length adjustment of the tie-down may be provided in the leg 32 of bight 30 as well as the leg 33, a similar securing device that is releasable being provided for the leg 32. The cable 15 thereby is completely releasable from the rest of the tie-down. Under this practice of the invention, a number of cable lengths 15 of different magnitudes are provided for a given tie-down, and these may be used alternatively for a greater range of length adjustment of the tie-down than is available with a single cable length 15.

In any cable length 15, a second knob 45 is secured to its end remote from the knob 36, the knobs 45 and 36 being the same and secured to the cable 15 in the same manner. Also, a second set of beads 46 are provided, which are the same as the beads 40 in all particulars, and which extend away from knob 45 along the cable 15 in the same manner that the beads 40 extend away from the knob 36 as hereinbefore described.

In the pressure block 17 a second securing device or member for the leg 32 of bight 30 comprises a slot 47, which is the same as the slot 34 in all particulars, and which including the socket 48 that is the same as socket 37. The base of the slot 47 is adjacent to the bore 18, on the side thereof opposite the slot 34, and slot 47 extends from its base to its opening in a direction away from bore 18, which is opposite to the direction that the slot 34 extends away from bore 18. Thus, the slots 34 and 47 and the bore 18 lie in the same plane as shown. The socket 48 forms a seat for any of the beads 46 or the knob 45 alternatively, the same as the socket 37 is alternatively companion to the beads 40 and knob 36. The leg 32 of bight 30 is secured to pressure block 17 by means of slot 47 in the same manner as is described hereinbefore that the leg 33 is secured to the pressure block 17 by means of slot 34.

Cleat 50 is provided to hold the two legs 32 and 33 of bight 30 pressed towards each other and to tighten the bight around the landing-gear post 11. Cleat 50 constitutes a block with a bore 51 extending through it, the cable 15 being threaded through the bore as shown. The bore 51 fits around the cable 15 loosely enough to constitute a guideway for cleat 50 to slide along cable 15. Block 50 also comprises a slot 52 alongside bore 51, constituting a passage into which the cable 15 may be actuated sideways to bear against the base 53 of the slot. Slot 52 extends away from its base 53 toward its opening at 54 in a direction towards the bore 51. The passage of slot 47 comprises the branch 55 that extends from base 53 towards bore 51 in a plane common to the base and the bore, and a continuing lateral branch 56 extending to the opening 54. The several branches 55 and 56 of the slot 52 constitute a tortuous passage that resists escape of cable 15 from the slot by vibrations of the tie-down, such as may occur during a storm. The opening 54 of slot 52 is canted at an angle to the base 53, and this constitutes additional security against the cable 15 escaping from slot 52 by the tie-down being vibrated.

Bore 51 and the base 53 of slot 52 constitute guideways for the cable 15 for sliding the cleat 50 along the cable. Bore 51 and base 53 of slot 52 are positioned alongside each other, and contain the respective legs 32 and 33 of bight 30. The bore 51 is positioned along the leg 32 for example, and the adjacent leg 33 is positioned in seating engagement with the base 53 of slot 52. The cleat 50 thus holds the two legs 32 and 33 of bight 30 pressed towards each other. By the cleat being actuated along the legs towards the landing gear post 11, the bight is clamped tightly around the post.

To operate the tie-down of the present invention, an airplane is positioned on the deck of an aircraft carrier where it is desired to be stowed, and a cable length 15 is selected that is appropriate for the tie-down to fit within the distance between the landing-gear post 11 and the nearest convenient deck eye 12 that happens to exist. Nut 19 is retracted along jack screw 16 to a position at or near the end stop 28. The selected cable length 15 is wrapped around the landing-gear post 11 to form the bight 30, with cleat 45 positioned along the leg 32 of the cable 15. Hook 22 is attached to the selected deck eye 12, and one of the legs 32 or 33 of bight 30 is inserted in its corresponding slot 47 or 34 respectively of the pressure block 17. Either leg 32 or 33 may be secured to the pressure block 17; in the present description it is assumed that leg 32 is first secured. A number of the group of beads 46 is selected to be positioned between block 17 and end knob 45 as determined by the desired length adjustment of the tie-down, and the end bead 46 of the selected group is seated into its corresponding socket 48. Now the right leg 33 of bight 30 is drawn taut around the landing-gear post 11, the appropriate number of the group of beads 40 is selected according to the length adjustment of the tie-down, and the end bead of the selected group is seated into socket 37 of the pressure block 17. Before tightening the tie-down by means of nut 19, the leg 33 of bight 30 is inserted into slot 52 of cleat 50 to seat against the base 53 of the slot, and the cleat is actuated along both legs 32 and 33 of the cable towards bight 30 as far as it can be moved manually. Thereby, a degree of tautness is applied to the tie-down, and the tie-down is now tightened more securely by the nut 19 being rotated on jack screw 16.

The disclosed structure is one practical embodiment of the invention, the scope of which is determined by the accompanying claims.

We claim:

1. In a stowage tie-down, a rigid tension member, a flexible tension member and a connection constituting a pressure block positionable between the members in bearing engagement with both under tension of the members opposed to each other, the rigid tension member comprising a jack post, an end attachment for the tie-down at one end of the jack post, the other end of the jack post projecting through the pressure block and comprising a jack take-up operable along the jack post and positionable to bear against the pressure block, the flexible member being formed into a bight to constitute an attachment for the tie-down at its end remote from the attachment of the jack post, a device securing the flexible member to the pressure block on each of opposite sides of the jack post and engaging each a leg of the bight, the engagement of the securing device for one leg of the bight comprising a slot in the pressure block that contains a socket, the engagement of the corresponding leg of the flexible member comprising a knob at the corresponding end of the flexible member and a plurality of beads threaded onto and slidable along the flexible member towards and away from the knob, the knob and each bead being alternatively companion to the slot and socket of the pressure block and each being contoured to fit into the socket for engagement therewith.

2. In a stowage tie-down as defined in claim 1, a cleat for the flexible tension member between the bight and the pressure block to hold the legs of the bight pulled towards each other, the cleat being slidable along the legs of the bight towards and away from the bight.

3. In a stowage tie-down as defined in claim 2, the cleat being threaded on and slidable along the flexible tension member and comprising a slot removably engageable by a leg of the bight at a position adjacent to the location of the cleat along the other leg.

4. In a stowage tie-down as defined in claim 1, the socket of the pressure block comprising a concave seat, the companion knobs and beads of the flexible member comprising each at its end remote from the knob end of the flexible member a convex abutment face contoured to fit into the concave seat of the pressure-block socket, each bead at its end nearest the knob end of the flexible member comprising a concave seat contoured to fit against its next adjacent convex abutment face.

5. In a stowage tie-down as defined in claim 1, the engagement for each leg of the bight on respective opposite sides of the jack post in the pressure block being alike and comprising a slot in the block on each of opposite sides of the jack post extending oppositely away therefrom, each slot containing a socket, and a knob at each of opposite ends of the flexible member.

6. In a stowage tie-down as defined in claim 5, a set of beads for each leg of the bight, the beads of each set comprising each a convex abutment face at its end remote from its corresponding end knob and a concave seat at its end nearest the knob.

7. In a stowage tie-down as defined in claim 1, the jack post comprising a screw jack, the attachment of the jack post comprising a hook, a pivot pin securing the hook to the jack post and extending transversely to the axis thereof to hold the jack post against rotating on its axis when the hook is engaged for stowage.

8. In a stowage tie-down as defined in claim 7, a keyway lengthwise of the jack post holding the pressure block from rotating on the axis of the jack post when the tie-down is securing stowage.

References Cited in the file of this patent

UNITED STATES PATENTS

| 170,024 | Seabury | Nov. 16, 1875 |
|---|---|---|
| 546,518 | Fountain | Sept. 17, 1895 |
| 932,398 | Kenney | Aug. 24, 1909 |
| 1,016,353 | Morgan | Feb. 6, 1912 |
| 1,185,804 | Lane | June 6, 1916 |
| 2,032,591 | Pride | Mar. 3, 1926 |
| 2,101,678 | Herschmann | Dec. 7, 1937 |
| 2,168,126 | Kane | Aug. 1, 1939 |
| 2,353,017 | Denton | July 4, 1944 |
| 2,481,755 | Jones | Sept. 13, 1949 |
| 2,560,695 | Huber | July 17, 1951 |